United States Patent [19]

Morawski et al.

[11] 3,909,021

[45] Sept. 30, 1975

[54] COLLET CHUCK

[75] Inventors: London T. Morawski, Mount Clemens; John J. Parker, Birmingham, both of Mich.

[73] Assignee: MP Tool & Engineering Co., Warren, Mich. ; by said Parker

[22] Filed: Jan. 14, 1974

[21] Appl. No.: 433,135

[52] U.S. Cl.................................. 279/2 R; 279/1 Q
[51] Int. Cl.² ........................................ B23B 31/40
[58] Field of Search..................... 279/2 R, 2 A, 1 Q; 242/72.1, 72; 269/48.1; 82/44

[56] References Cited
UNITED STATES PATENTS

| | | | |
|---|---|---|---|
| 2,877,022 | 3/1959 | Parker et al. ......................... | 279/1 Q |
| 3,420,537 | 1/1969 | Walters................................... | 279/2 |
| 3,517,939 | 6/1970 | Jaehn...................................... | 82/44 |
| 3,697,092 | 10/1972 | Anthony ................................. | 82/44 |
| 3,735,994 | 5/1973 | Jaehn................................. | 269/48.1 |

*Primary Examiner*—Gil Weidenfeld
*Attorney, Agent, or Firm*—Barnes, Kisselle, Raisch & Choate

[57] ABSTRACT

A collet chuck for gripping the bore of a workpiece. The chuck has an axially slotted outer expandable work-gripping sleeve and an inner collet expander. The sleeve and expander are relatively axially shiftable to expand and contract the sleeve. The slots are filled with an elastomer and the open end of the sleeve has a rubber cap thereon, the elastomer filled slots and the rubber cap preventing the ingress of dirt, chips, etc., into the work-gripping sleeve.

7 Claims, 2 Drawing Figures

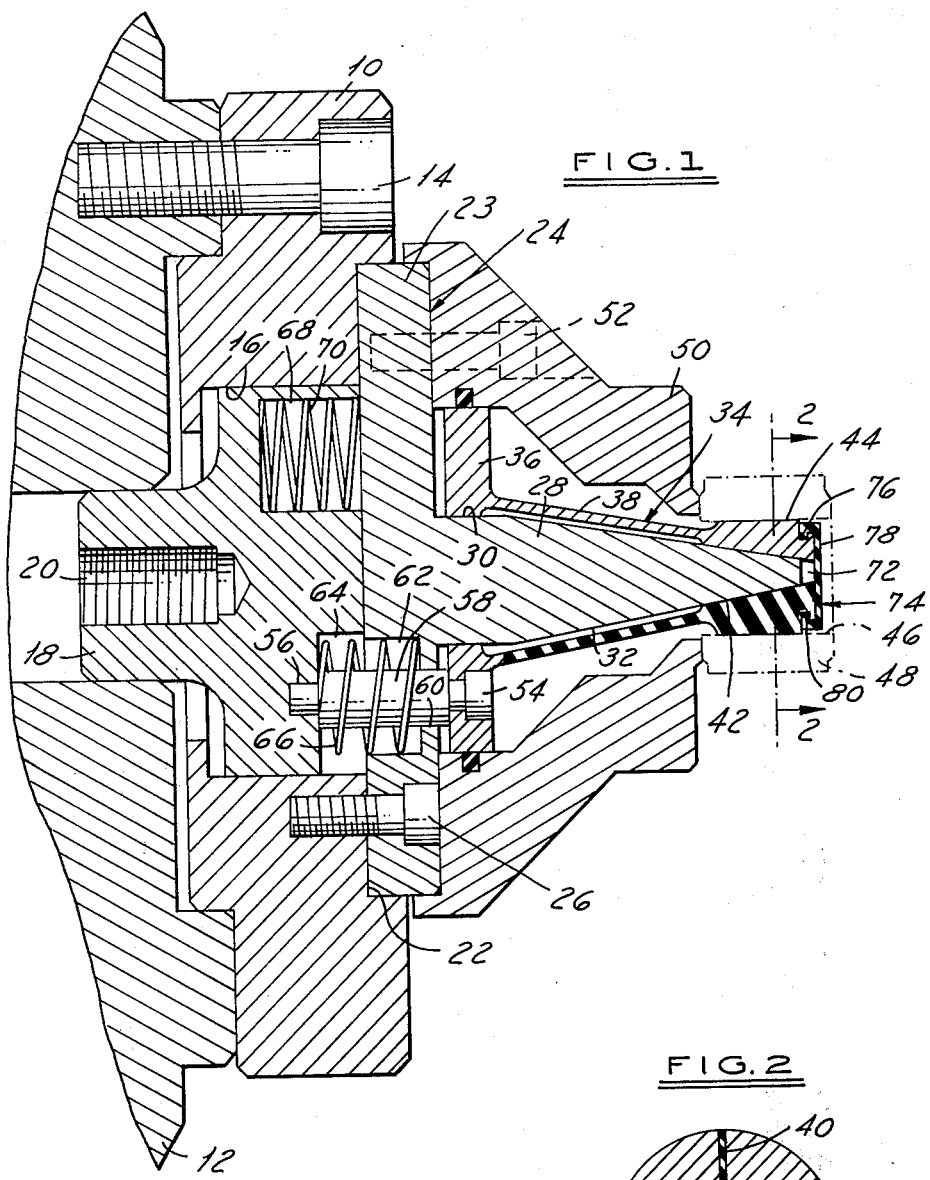

COLLET CHUCK

This invention relates to a collet chuck, and, more particularly, to a collet chuck provided with means for preventing the ingress of dirt, chips, etc., into the openings or spaces between the working components thereon.

Collet chucks of the type used for gripping the bore of a workpiece normally include an outer expandable sleeve and an inner collet expander. The expander sleeve is normally slotted lengthwise to provide a plurality of spring fingers which are flexed radially to grip and release the bore of a workpiece when the sleeve and the expander are shifted axially relative to one another. Frequently the slots between the fingers of the expander sleeve are filled with an elastomer (such as silicone rubber) to prevent dirt and the like from accumulating in the spaces between the fingers. However, with such constructions foreign matter can still get into the sleeve and between the sleeve and expander through the open front end of the sleeve.

The object of this invention is to provide a chuck of the type described which is constructed to prevent the ingress of foreign material into the expander sleeve.

More specifically, the present invention contemplates a collet chuck of the type described which includes a cap formed of an elastomeric material covering the open end of the sleeve and which not only prevents ingress of dirt, chips and the like into the sleeve, but which also assists in contracting the spring fingers to facilitate loading a workpiece on the chuck.

Other objects and features of the present invention will become apparent from the following description and accompanying drawing, in which:

FIG. 1 is a cross sectional view of a chuck embodying the present invention; and FIG. 2 is a sectional view along the line 2—2 in FIG. 1.

In general, the collet chuck of this invention is of conventional construction. It comprises a circular base plate 10 which is adapted to be fixedly mounted on the spindle 12 of a machine tool by a plurality of screws 14. Base plate 10 is formed with a central bore 16 in which a collet actuator 18 is arranged for axial sliding movement. The rear end of actuator 18 is provided with a threaded opening 20 with which a drawbar (not shown) may be engaged to reciprocate actuator 18.

The front face of base plate 10 is formed with a circular recess 22 in which the base flange 23 of an expander member 24 is securely mounted, as by screws 26. Expander member 24 has a forwardly projecting boss 28 which is shaped as a cylinder as at 30 and as a conical nose as at 32. The expanding collet member, generally designated 34, has an annular base plate portion 36 which is guided for axial movement on the cylindrical portion 30 of boss 28. Collet member 34 includes a sleeve portion comprising a plurality of circumferentially adjacent spring fingers 38 which are separated by slots filled with an elastomer 40, such as silicone rubber or the like. The distal end of collet member 34 is internally tapered as at 42 to correspond with the taper on the conical nose 32 of the expander. The outer periphery of member 34 at its distal end is cylindrically shaped as at 44 for engaging the internal bore 46 of a workpiece 48. The axial position of workpiece 48 on collet member 34 is determined by an annular stop 50 concentrically mounted on expander member 24 by screws 52.

A plurality of screws 54 extend axially through the annular flange 36 of collet member 34 and have their ends secured as by brazing or the like as at 56 in actuator 18. A bushing 58 surrounds the portion of each screw 54 behind the annular flange 36. Bushings 58 extend through openings 60 in the circular flange 23 of expander 24 and through registering sockets 62,64 in flange 23 and actuator 18. A compression spring 66 circumscribes each bushing 58 in sockets 62,64. Circumferentially intermediate the sockets 64 actuator 18 is provided with additional sockets 68 in which compression springs 70 are arranged. Compression springs 66,70 urge actuator 18 rearwardly in the direction of spindle 12. Since collet member 34 is fixedly attached to actuator 18 by screws 54, it will be appreciated that springs 66,70 accordingly urge sleeve 34 axially in a direction such that the tapered nose 32 expands the fingers and, particularly, the cylindrical portions 44 thereof radially outwardly to grip the bore of workpiece 48. The fingers 38 of collet member 34 are collapsed radially inwardly to release the workpiece by shifting actuator 18 axially towards the right as viewed in FIG. 1. against the bias of springs 66,70.

The collet construction thus far described is more or less conventional. The invention is specifically directed to the means for preventing ingress of dirt, chips and the like through the forward open end 72 of collet member 34. In the arrangement illustrated this is achieved by utilizing a rubber cap 74 over the open end of the collet member. The distal end of collet member 34 is of reduced diameter relative to the adjacent cylindrical portion 44 and is formed with an annular groove 76. Cap 74 is shaped as a circular disc 78 which overlies the front flat face of member 34. Around its periphery disc 78 is formed with a flange having a radially inwardly turned lip 80 which is engaged in groove 76 to retain cap 74 on the end of member 34. Cap 74 is dimensioned so that it is in radial tension when applied to the end of member 34. This radial tension serves to urge the spring fingers 38 to the contracted position when the member 34 is shifted axially forwardly on the tapered portion 42 of boss 28.

Since the slots between adjacent fingers 38 are filled with an elastomer, such as indicated at 40, and since the open forward end of member 34 is effectively sealed by cap 74, it follows that dirt, chips and the like are effectively prevented from entering member 34 from either around its outer periphery or through the forward open end thereof. This insures long continued use of the chuck without the usual problems caused by dirt, chips and the like. In addition, as pointed out above, cap 74 is designed to exert a contracting force on fingers 38; this facilitates automatic loading of workpieces 48 on the cylindrical portion 44 of the sleeve when the sleeve is shifted axially forwardly on the conical boss 28 of expander 24. Furthermore, cap 74 is readily removable and replaceable if necessary for servicing the chuck.

We claim:

1. A collet chuck comprising, a sleeve having an open end and having adjacent said end a work-gripping outer surface portion of cylindrical shape concentric with the axis of the sleeve, said sleeve having a plurality of axial slots therein extending to the open end of the sleeve and defining a plurality of circumferentially arranged spring fingers which, when flexed radially outwardly, are adapted to increase the effective diameter of said work-gripping portion for engaging the bore of a workpiece, said slots being filled with an elastomer, said sleeve having a conical inner surface portion axially adjacent said work-gripping portion, a collet expander within said sleeve having an outer conical surface portion interfitting with the inner conical surface portion of said sleeve whereby, when said sleeve and expander are shifted axially relative to one another, said spring fingers are flexed radially to engage and disengage with the bore of a workpiece circumscribing said work-gripping portion, and a cap member formed of an elastomeric material mounted on said end of said sleeve and overlying said opening in said end of the sleeve to prevent the ingress of dirt, chips and the like into said sleeve through the open end thereof, said cap having an axially extending annular flange circumferentially circumscribing the outer peripheral portion of said sleeve and frictionally engaged therewith so as to be adapted to be readily removed and replaced.

2. A collet chuck as called for in claim 1 wherein said one end of said sleeve defines an annular, generally flat face perpendicular to the axis of said sleeve and said cap has a disc portion at one end of said flange overlying said flat face.

3. A collet chuck as called for in claim 1 wherein said cap is in a radially tensioned condition and tends to urge said spring fingers radially inwardly to a contracted condition.

4. A collet chuck as called for in claim 1 wherein said cap is of circular shape and said annular flange has an outer diameter less than the diameter of said cylindrical work-gripping portion.

5. A collet chuck as called for in claim 1 wherein said sleeve is provided adjacent said end thereof with a circumferential groove extending around the outer periphery thereof, said flange having a radially inwardly extending lip thereon which is seated in said groove to retain the cap on the end of the sleeve.

6. A collet chuck as called for in claim 1 wherein said work-gripping portion is spaced axially inwardly from said open end of the sleeve, the portion of the sleeve extending axially beyond said workgripping portion having a diameter smaller than the work-gripping portion and defining an axially extending circumferential shoulder at said end of said sleeve, said flange extending around the outer periphery of and resiliently engaging said shoulder.

7. A collet chuck as called for in claim 6 including a circumferential radially inwardly extending groove on said shoulder, said flange having a circumferential radially inwardly extending lip around the inner periphery thereof resiliently engaging said groove.

* * * * *